US009260135B2

(12) United States Patent
Butukuri et al.

(10) Patent No.: US 9,260,135 B2
(45) Date of Patent: Feb. 16, 2016

(54) DEFLECTOR STRUCTURE

(71) Applicant: Ford Global Technologies, LLC, Dearborn, MI (US)

(72) Inventors: Ramanjaneya Reddy Butukuri, Troy, MI (US); Yi Tony Qu, Troy, MI (US); Chris Stephen O'Connor, Livonia, MI (US); Ahteram Khan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/297,490

(22) Filed: Jun. 5, 2014

(65) Prior Publication Data
US 2015/0353040 A1     Dec. 10, 2015

(51) Int. Cl.
*B62D 21/15* (2006.01)
*B60R 19/16* (2006.01)
*B60R 19/04* (2006.01)
*B60R 19/34* (2006.01)

(52) U.S. Cl.
CPC .............. *B62D 21/155* (2013.01); *B60R 19/04* (2013.01); *B60R 19/16* (2013.01); *B60R 19/34* (2013.01)

(58) Field of Classification Search
CPC .............. B60R 19/34; B60R 2019/007; B60R 2019/26; B60R 2021/0009; B60R 2021/0023; B60R 2019/262
USPC ................................ 293/133, 155; 296/187.1
See application file for complete search history.

(56) References Cited

U.S. PATENT DOCUMENTS

| | | | |
|---|---|---|---|
| 6,971,694 B2 * | 12/2005 | Sakuma et al. | 293/133 |
| 8,398,154 B1 | 3/2013 | Nusier et al. | |
| 8,469,416 B2 * | 6/2013 | Haneda et al. | 293/133 |
| 8,480,102 B2 * | 7/2013 | Yamada et al. | 280/124.109 |
| 8,490,988 B2 * | 7/2013 | Takeshita et al. | 280/124.109 |
| 8,567,849 B2 | 10/2013 | Rawlinson | |
| 8,905,415 B2 * | 12/2014 | Takeshita et al. | 280/124.109 |
| 2005/0179268 A1 * | 8/2005 | Kollaritsch et al. | 293/133 |
| 2010/0052342 A1 * | 3/2010 | Wurtemberger | 293/132 |
| 2011/0187135 A1 * | 8/2011 | Kano et al. | 293/133 |
| 2012/0056447 A1 * | 3/2012 | Yoshida | 296/193.09 |

(Continued)

FOREIGN PATENT DOCUMENTS

| | | |
|---|---|---|
| DE | 102004062932 | 8/2006 |
| DE | 102006011774 | 4/2007 |

(Continued)

OTHER PUBLICATIONS

Del Pozo de Dios et al., "Optimizing Vehicle Structure Architectures for Light Trucks", Paper No. 13-0363, 2013 (10 pps).

(Continued)

*Primary Examiner* — Dennis H Pedder
(74) *Attorney, Agent, or Firm* — Jason C. Rogers; Bejin Bieneman PLC

(57) ABSTRACT

A deflector member comprises opposing first and second walls and a plurality of sidewalls arranged adjacent to each other and between the first and second walls, the sidewalls having a cross-sectional shape between the first and second walls that is at least three-sided. The deflector member is adapted to mount to a vehicle frame. The deflector member is further adapted to extend distally from the first wall to the second wall relative to the vehicle frame, and away from a centerline of the vehicle frame.

20 Claims, 4 Drawing Sheets

(56) References Cited

U.S. PATENT DOCUMENTS

| | | | |
|---|---|---|---|
| 2012/0248819 A1* | 10/2012 | Okamura et al. | 296/187.1 |
| 2013/0001964 A1 | 1/2013 | Freundl et al. | |
| 2013/0099461 A1* | 4/2013 | Otani et al. | 280/124.109 |
| 2013/0300138 A1* | 11/2013 | Banasiak et al. | 293/133 |
| 2014/0252739 A1* | 9/2014 | Otani et al. | 280/124.109 |

FOREIGN PATENT DOCUMENTS

| | | |
|---|---|---|
| DE | 202009017309 U1 | 4/2010 |
| DE | 102009031745 | 1/2011 |
| EP | 1451041 | 7/2005 |
| EP | 2540575 | 1/2013 |
| WO | WO 2012163487 | 12/2012 |

OTHER PUBLICATIONS

O'Brien, "Priorities for the Assessment of Frontal Impact Compatibility", Paper No. 11-0295, 2012 (11 pps).

* cited by examiner

DEFLECTOR STRUCTURE

BACKGROUND

Off-center vehicle crashes can occur when a corner of a vehicle strikes another vehicle or object, such as a tree or a utility pole. Off-center collisions present safety issues for a vehicle's occupants, because a vehicle's front or rear-end safety structures may not be positioned to absorb impact energy to help protect the occupants. In fact, the other vehicle or object may miss a front or rear-end safety structure entirely. The Insurance Institute for Highway Safety ("IIHS") has thus introduced new testing methodologies to assess a vehicle's crashworthiness in off-center collisions. These include the Small Overlap Frontal Crashworthiness Evaluation Crash Test. Many of today's vehicles are not able to achieve an IIHS rating of "good" under this testing protocol without major, structural design changes. One approach uses ultra-high strength materials. Another increases the gages of materials used to deflect energy. These approaches, however, increase a vehicle's cost and weight.

DRAWINGS

DETAILED DESCRIPTION

Figure 1:
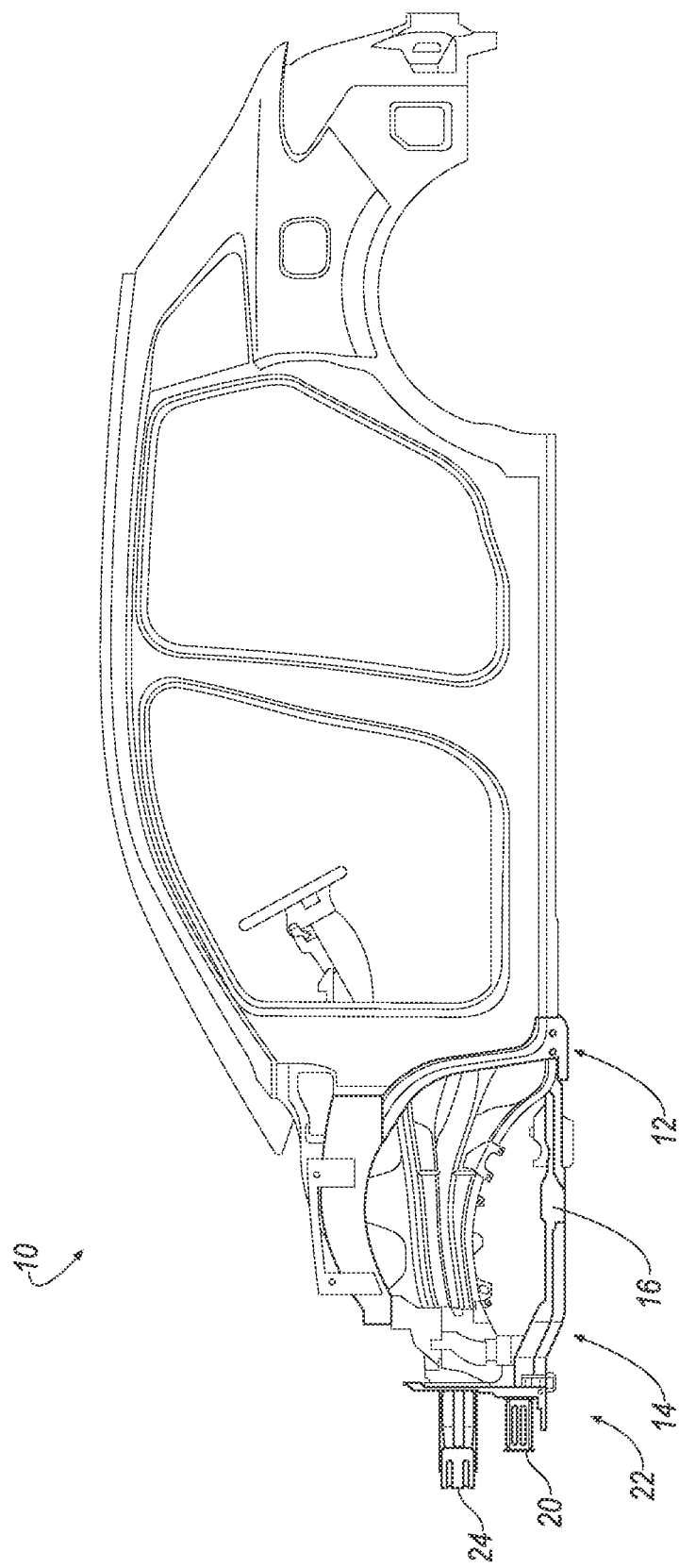
FIG. 1 is a side view of a vehicle frame that includes an exemplary deflector member.

FIG. 1 shows a side view of a vehicle frame 10. Vehicle frame 10 includes a chassis 12, which in turn includes a sub-frame 14. The sub-frame 14 includes a plurality of rails 16 and a cross member 18 (shown in FIG. 2). In the example of FIG. 1, a deflector member 20 is mounted to a first end 22 of chassis 12. The deflector member 20 may be comprised of metal or similar material, and, as illustrated in FIGS. 3 and 4, can include a first wall 30, a second wall 32, and a plurality of sidewalls 34. The sidewalls 34 are adjacent to each other and extend between the first wall 30 and the second wall 32 (as shown in FIGS. 4A-4D). Continuing with FIG. 1, a first bumper 24 is attached to the vehicle frame 10 and is located distally of the deflector member 20 relative to the vehicle frame 10. The deflector member 20 is located at least partially below the first bumper 24. That is, the deflector member 20 is closer to a ground surface than the first bumper 24, and a top of the deflector member 20 is below a bottom side of the first bumper 24. Further, by "partially" below, it is meant that a top view, such as seen in FIG. 2, would show at least some overlap between the bumper 24 and member 20.

Figure 2:
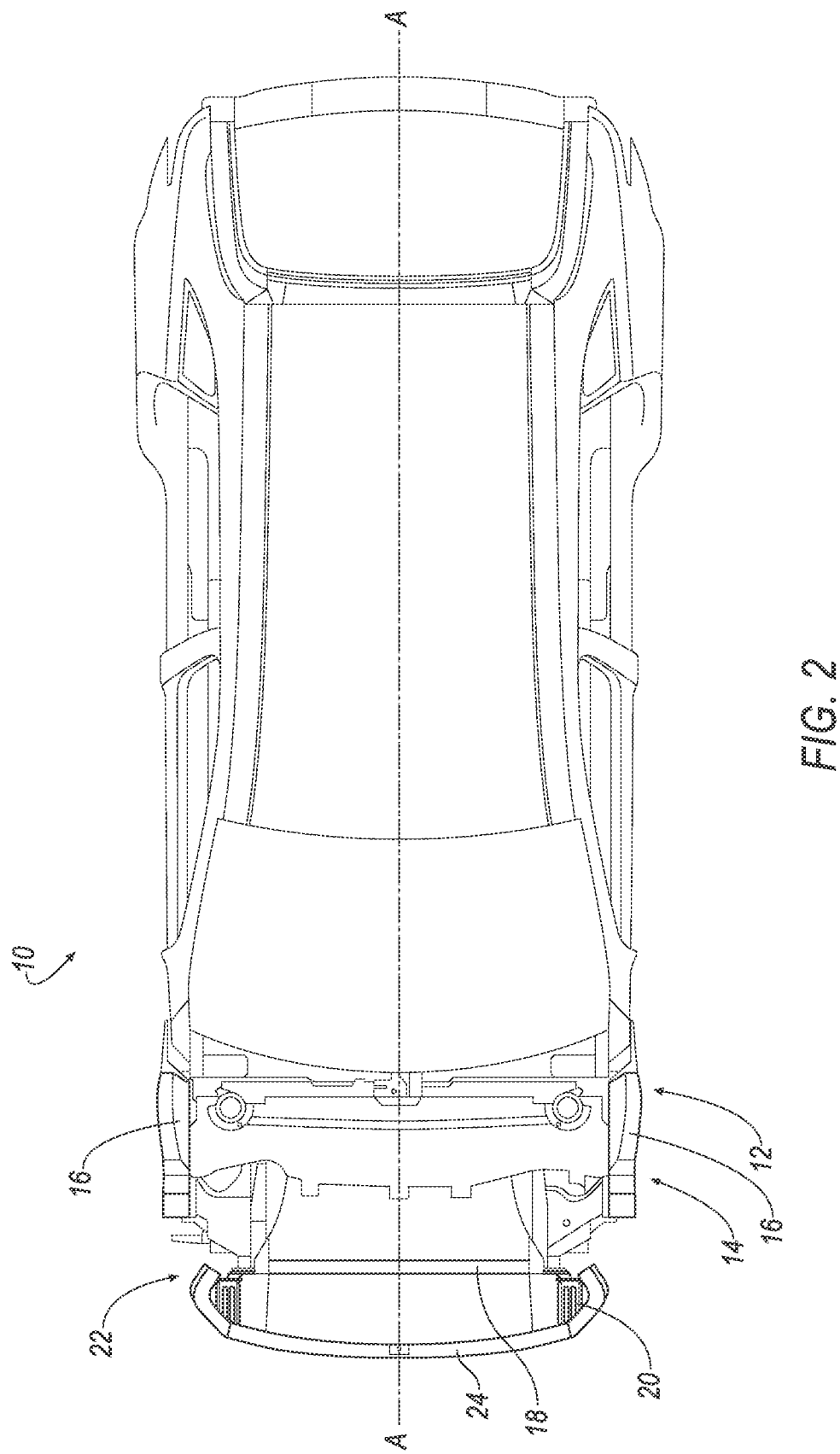
FIG. 2 is a top view of a vehicle frame that includes an exemplary deflector member.
Figure 3:
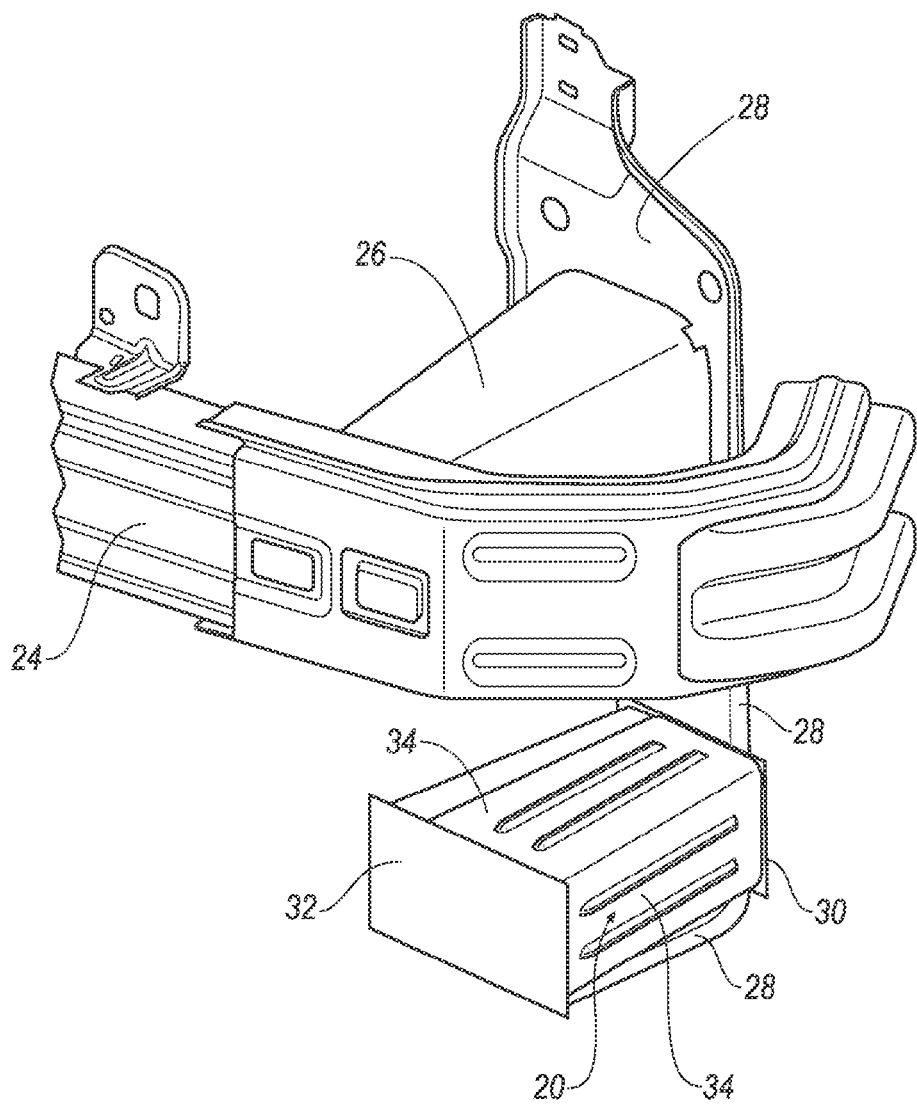
FIG. 3 is a perspective view of an exemplary deflector member.

FIG. 2 is a top view of the exemplary vehicle frame 10 of FIG. 1. FIG. 2 illustrates an axis A that defines a centerline of the vehicle frame 10, as well as respective centerlines of elements thereof, including the chassis 12, the sub-frame 14, and the cross-member 18. The first wall 30 of the deflector member 20 is mounted to a first end 22 of the chassis 12, e.g., in a manner such as discussed below with respect to FIG. 3, with the deflector member 20 extending distally relative to the vehicle frame 10, and terminating in the opposing second wall 32.

The deflector member 20 is mounted a distance away from the centerline A of the vehicle frame 10, as shown in FIG. 2. In one example, the distance is a distance that is 25% of a width of the vehicle frame 10, i.e., the deflector member 20 is located 25% of the width of the vehicle frame 10 away from the centerline A.

As also shown in FIG. 2, the chassis 12 includes the sub-frame 14, the plurality of rails 16, and the cross member 18. By mounting the deflector member 20 to the sub-frame 14 away from centerline A of the vehicle frame 10, energy from an off-center collision is advantageously absorbed by the deflector member 20 and transferred to the sub-frame 14, including the rails 16 and the cross member 18.

Referring now to FIG. 3, the first bumper 24 is mounted to a crush can 26, which is mounted to an endplate 28. The endplate 28 is mounted to the first end 22 of the chassis 12 (not shown in FIG. 3). The deflector member 20 is mounted to the endplate 28. For example, the first wall 30 of the deflector member 20 may be welded to the endplate 28, although it will be appreciated that there are many other ways in which the deflector member 20 can be mounted to the chassis 12 of vehicle body 10, e.g., rivets, bolts, etc.

The sidewalls 34 of the deflector member 20 have a cross-sectional shape between the first wall 30 and second wall 32 that is at least three-sided. Moreover, the second wall 32 may have a larger surface area than the first wall 30 of the deflector member 20. The increased surface area of the second wall 32 increases the likelihood that the deflector member 20 will be engaged in the event of an off-center collision. Further, the first wall 30 of the deflector member 20 may be arranged to facilitate mounting to the endplate 28, or directly to the chassis 12, including the sub-frame 14, one or more rails 16, and the cross-member 18. The sidewalls 34 may also include a plurality of ridges 36 that run between the first wall 30 and second wall 32. The ridges 36, if included, can serve to increase the rigidity of the deflector member 20 to further enhance energy absorption from an off-center collision.

Figure 4A:
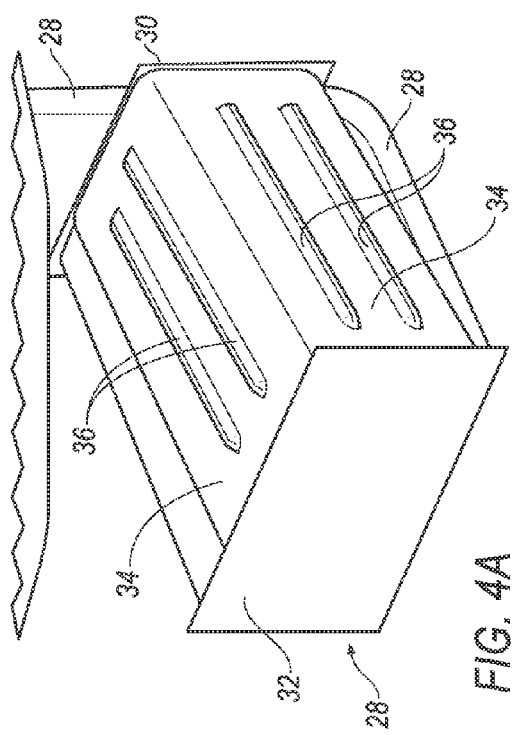
FIG. 4A is a perspective view of an exemplary deflector member.

FIGS. 4A through 4D depict respective views of the deflector member 20. FIG. 4A is a perspective view of the deflector member 20. Here, too, the deflector member 20 is shown mounted to the endplate 28, which is mounted to chassis 12. As FIG. 4A shows, the exemplary deflector member 20 includes a first wall 30 and an opposing second wall 32, with the sidewalls 34 extending between the first wall 30 and second wall 32. As FIG. 4A further shows, the sidewalls 34 include a plurality of the ridges 36 running between the first wall 30 and the second wall 32 to enhance energy absorption by the deflector member 20.

Figure 4B:
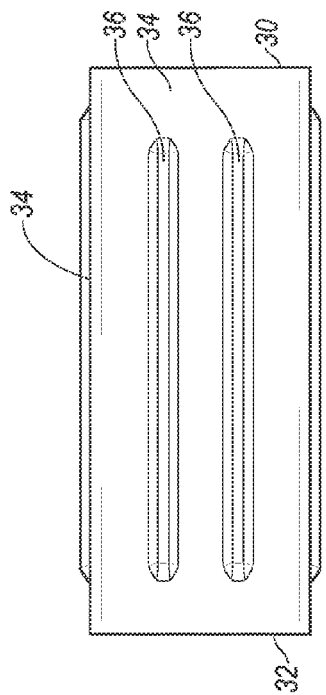
FIG. 4B is a side view of an exemplary deflector member.
Figure 4C:
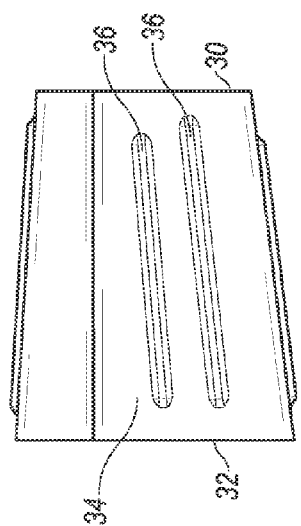
FIG. 4C is a top view of an exemplary deflector member.
Figure 4D:
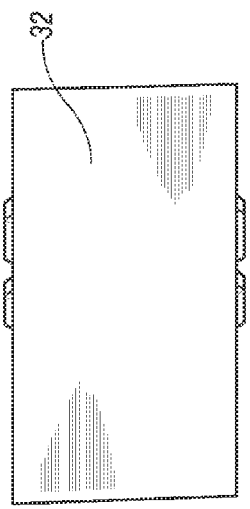
FIG. 4D is a front view of an exemplary deflector member.

FIG. 4B depicts a side view of the deflector member 20, which includes the sidewalls 34. Also shown are the first wall 30 and the second wall 32. FIG. 4C, on the other hand, is a top view of deflector member 20, while FIG. 4D is a front view of deflector member 20, showing the second wall 32.

As used herein, the adverb "substantially" modifying an adjective means that a shape or structure may deviate from an exact described geometry because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A deflector member comprising:
opposing first and second walls;
a plurality of sidewalls arranged adjacent to each other and between the first and second walls, the sidewalls having a cross-sectional shape between the first and second walls that is at least three-sided at least one of the sidewalls including a ridge extending between the first wall and the second wall;
the deflector member being adapted to mount to an endplate at the first wall on a vehicle frame, the endplate extending downwardly from a vehicle chassis such that the deflector member, when mounted to the endplate, extends forward from the endplate with respect to the chassis and is beneath a vehicle bumper; and
the deflector member being further adapted to extend distally from the first wall to an exposed surface of the second wall relative to the vehicle frame, and away from a centerline of the vehicle frame below a crush can mounted to the endplate.

2. The deflector member of claim 1, wherein the first wall of the deflector member is adapted to be mounted to a chassis of the vehicle frame.

3. The deflector member of claim 1, wherein the first wall of the deflector member is adapted to be mounted to a sub-frame of the vehicle frame.

4. The deflector member of claim 1, wherein the first wall of the deflector member is adapted to be mounted to a rail of the vehicle frame.

5. The deflector member of claim 1, wherein the first wall of the deflector member is adapted to be mounted to a cross member of the vehicle frame.

6. The deflector member of claim 1, wherein the deflector member is constructed from metal.

7. The deflector member of claim 1, wherein the ridge extends partially from the first wall to the second wall.

8. A vehicle frame, comprising:
a chassis;
a deflector member having a first wall and an opposing second wall, the first wall mounted to an endplate mounted to the chassis, the endplate extending downwardly from the chassis such that the deflector member, when mounted to the endplate, extends forward from the endplate with respect to the chassis and is beneath a vehicle bumper, wherein the deflector member extends distally relative to the vehicle frame and terminates at an exposed surface of the second wall;
a plurality of sidewalls arranged adjacent to each other and between the first and second walls; and
wherein the deflector member extends away from a centerline of the vehicle frame below a crush can mounted on the endplate.

9. The vehicle frame of claim 8, wherein the deflector member is mounted to a sub-frame.

10. The vehicle frame of claim 8, wherein the deflector member is mounted to a rail.

11. The vehicle frame of claim 8, wherein the deflector member is mounted to a cross member.

12. The vehicle frame of claim 8, wherein at least one of the sidewalls includes a ridge extending from the first wall to the second wall.

13. The vehicle frame of claim 12, wherein the ridge extends partially from the first wall to the second wall.

14. The vehicle frame of claim 8, wherein the deflector member has a cross-sectional shape between the first wall and second wall that is at least three-sided.

15. The vehicle frame of claim 8, wherein the second wall has a larger surface area than the first wall.

16. The vehicle frame of claim 8, wherein the deflector member is mounted to a first end of the vehicle frame away from a centerline of the vehicle frame.

17. The vehicle frame of claim 16, where the deflector member is mounted a distance away from the centerline of the vehicle frame, wherein the distance away is substantially 25% of the width of the vehicle frame.

18. The vehicle frame of claim 8, wherein the deflector member is located at least partially below the first bumper.

19. A vehicle frame, comprising:
a chassis including a sub-frame;
an endplate adapted to mount to the chassis;
a deflector member having a first wall and an opposing second wall, the first wall being mounted to the sub-frame, wherein the deflector member extends distally relative to the vehicle frame and terminates at an exposed surface of the second wall; and
a plurality of sidewalls arranged adjacent to each other and between the first and second walls;
wherein the deflector member is adapted to mount to the endplate, the endplate extending downwardly from the chassis such that the deflector member, when mounted to the endplate, extends forward from the endplate with respect to the chassis and is beneath a vehicle bumper and further adapted to extend distally from the first wall to the second wall relative to the vehicle frame, below a crush can mounted on the endplate, and away from a centerline of the vehicle frame to absorb energy during an off-center collision.

20. The vehicle frame of claim 19, wherein at least one of the sidewalls includes a ridge protruding from the sidewall and extending partially between the first wall and the second wall.

* * * * *